Patented May 13, 1947

2,420,567

UNITED STATES PATENT OFFICE 2,420,567

PROCESS FOR THE TREATMENT OF MALT SPROUTS FOR USE IN BAKERIES

Roland W. Selman, Jr., Kansas City, Kans., and Homer S. Myers, Kansas City, Mo., assignors to Campbell-Taggart Research Corporation, Kansas City, Mo., a corporation of Missouri No Drawing. Application February 22, 1943, Serial No. 476,769

4 Claims. (Cl. 99—91)

This invention relates to a process for treatment of malt sprouts for use in bakeries and the like and the malt sprout product formed by said process. More particularly, the invention relates to a process for removing objectionable or injurious substances from malt sprouts in such a manner as to form a product that does not injuriously affect bread dough when used in sufficient quantities to supply glutathione to the flour used in the bread.

Malt sprouts are by-products of malt manufacturing processes. They are chiefly produced by allowing wheat or barley to sprout under carefully controlled conditions of humidity and temperature for the purpose of increasing the diastatic enzyme content of the berry. After the sprout, or acrospire, of the grain has been allowed to attain a predetermined length, the sprout is removed and constitutes a by-product, whereas the remainder of the grain is ground to form the desired malt cereal.

The embryonic cereal sprouts are also rich in glutathione, barley sprouts containing approximately 4 to 5 mg. of glutathione per gram, and may be incorporated in bread dough for the purpose of reducing dough mixing time. It has been impractical to use malt sprouts in bread dough for the reason that the sprouts contain a substance that is extremely injurious to bread quality. For example, when barley sprouts, equivalent to as little as 0.25% of the total weight of the flour, are used, a deleterious effect on the quality of the bread dough is experienced.

The principal object of the present invention is to provide a process for treating malt sprouts for removing lipoidal material and other substances injurious to bread quality without destroying the glutathione content of said sprouts.

Another object of the invention is to provide a processed malt sprout material that may be used in bread dough for improving the characteristics of the dough.

In accomplishing these and other objects of the present invention, we have provided improved steps and sequences thereof to produce a dependable malt sprout material capable of being mixed in a bread dough.

More particularly, we have found that the injurious substances present in malt sprouts are soluble in organic solvents which dissolve lipoidal compounds. We have further found that the organic solvents capable of removing phospho-lipid fractions are especially effective in removing the objectionable substances from the malt sprouts.

As an example, barley malt sprouts which have been ground and then extracted twice with ether, no longer exert their injurious effect on bread dough, when used in quantities sufficient to supply 10–60 parts glutathione to a million parts of flour. When the ether is evaporated from the extracted fraction, this fraction is found to be injurious to bread dough when used in extremely small amounts. Amounts as small as 0.003% of the extracted fraction have a noticeable deleterious effect on the baking qualities of the dough.

We have found that approximately 1.0% to 1.5% of the barley malt sprouts is lipoidal material capable of being extracted by petroleum ether, and while said lipoidal material may be removed by several procedures, we prefer to use the following steps and sequences thereof.

Hulls of the malt berry are usually present with the malt sprouts. We, therefore, prefer to separate the sprouts from said hulls by screening. The separated sprouts are then ground in a mill until pulverized preparatory to extraction. Our preferred method of extraction of the lipoidal material is by extracting the pulverized sprouts twice with approximately five times their weight of ethyl ether or petroleum ether and allowing 15 minutes for the solvent to remain in contact with the sprouts on each extraction before filtering. After the solvent has remained in contact with the sprouts for the desired time, the material is filtered or centrifuged and the residue heated to evaporate the traces of ether, said ether vapors being removed by passing an air stream over the heated residue to reduce the temperature required. Said temperature is preferably maintained at a point below 40° C. to prevent destruction of glutathione in the sprouts. With this process, the solvent, as well as the lipids, may be recovered by distillation of the filtrate.

After ether has been removed from the residue, the moisture content may be lowered preferably to below 8% moisture content by controlled heat and/or vacuum to stabilize the material, particularly the glutathione, for storage. Such treated material, particularly barley sprouts, usually contains 4 to 5 mg. glutathione per gram and may be mixed with bread dough in sufficient quantities to supply 10 to 60 parts glutathione per million parts of flour for reducing the mixing time for said dough without any deleterious effect thereon.

While we have particularly described the use of ethyl ether and petroleum ether as a solvent for the lipoidal material, it is obvious that other organic fat solvents may be used. Examples of other solvents that may be used for extracting the malt sprouts are benzene, chloroform, hexane, heptane, toluene and alcohol. It is also apparent that the solvents may be used singly or in series such as a preliminary extraction with ethyl alcohol followed by a treatment or extraction with ethyl ether. It is also apparent that we provide a convenient and economical process for the removal of lipoidal and/or injurious material from malt sprouts to provide a suitable material that may be used as a source of glutathione and mixed with bread dough to reduce mixing time for said dough.

What we claim and desire to secure by Letters Patent is:

1. The method of conditioning malt sprouts for use in bakeries comprising pulverizing the malt sprouts, treating the pulverized sprouts at least once with ether of a quantity approximately five times the weight of the sprouts for approximately 15 minutes for extracting said sprouts, separating the ether and substances dissolved therein from the extracted sprout residue, and drying said sprout residue.

2. The method of conditioning malt sprouts having glutathione therein for use as a dough improver in making bakery products, comprising screening hulls and other impurities from the sprouts, pulverizing the sprouts, treating the pulverized sprouts at least once with organic solvent of a quantity approximately five times the weight of the sprouts for approximately 15 minutes for extracting said sprouts, removing the extracted fractions from the sprouts, and drying the extracted sprouts to reduce the moisture content thereof to less than 8% for stabilizing the glutathione in the conditioned sprouts.

3. The method of conditioning malt sprouts having glutathione therein for use in bakeries comprising, treating the malt sprouts with an organic solvent for dissolving lipoidal substances in the malt sprouts, separating the solvent and dissolved substances from the sprout residue, and removing traces of the solvent from the sprout residue at a temperature of less than 40° C. to prevent heat destruction of the glutathione in the sprout residue.

4. The method of conditioning malt sprouts having glutathione therein for use as a dough improver in making bakery products, consisting of pulverizing the malt sprouts, treating the pulverized sprouts at least once with ether for approximately 15 minutes to dissolve the lipoidal substances in said sprouts, separating the ether and substances dissolved therein from the sprout residue, evaporating traces of ether from the residue at a temperature of less than 40° C. to prevent heat destruction of the glutathione therein, and drying the sprout residue to reduce the moisture content to less than 8% to reduce oxidation of the glutathione in said residue.

ROLAND W. SELMAN, Jr.
HOMER S. MYERS.

REFERENCES CITED

The following references are of record in the file of this patent:

UNITED STATES PATENTS

| Number | Name | Date |
|---|---|---|
| 2,368,384 | Selman et al. | Jan. 30, 1945 |

FOREIGN PATENTS

| Number | Country | Date |
|---|---|---|
| 328,942 | Great Britain | May 5, 1930 |